US012162723B2

(12) United States Patent
Witczak et al.

(10) Patent No.: US 12,162,723 B2
(45) Date of Patent: Dec. 10, 2024

(54) ELEVATOR CAR POSITION DETERMINATION

(71) Applicant: Otis Elevator Company, Farmington, CT (US)

(72) Inventors: Tadeusz Pawel Witczak, Farmington, CT (US); Derk Oscar Pahlke, Berlin (DE); Craig Drew Bogli, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1470 days.

(21) Appl. No.: 16/590,651

(22) Filed: Oct. 2, 2019

(65) Prior Publication Data

US 2020/0109027 A1 Apr. 9, 2020

(30) Foreign Application Priority Data

Oct. 4, 2018 (EP) .................................... 18198698

(51) Int. Cl.
*B66B 1/34* (2006.01)
*B66B 3/02* (2006.01)

(52) U.S. Cl.
CPC .............. *B66B 1/3492* (2013.01); *B66B 3/02* (2013.01)

(58) Field of Classification Search
CPC ... B66B 1/3492; B66B 5/0018; B66B 5/0025; B66B 5/0037; B66B 5/0031; B66B 1/40; B66B 3/02; B66B 5/0006; B66B 5/00; B66B 9/003; B66B 11/0246
See application file for complete search history.

(56) References Cited

U.S. PATENT DOCUMENTS

| | | | |
|---|---|---|---|
| 5,306,882 | A | 4/1994 | Gerwing et al. |
| 5,682,024 | A | 10/1997 | Koopman, Jr. et al. |
| 5,736,695 | A | 4/1998 | Hoepken |
| 6,311,803 | B1 | 11/2001 | Turk |
| 6,366,532 | B1 | 4/2002 | Hoepken |
| 6,570,817 | B2 | 5/2003 | Hoepken |
| 6,659,232 | B2 | 12/2003 | Oelschlegel |
| 7,077,244 | B2 | 7/2006 | Oh et al. |

(Continued)

FOREIGN PATENT DOCUMENTS

| | | | |
|---|---|---|---|
| CN | 102112384 | A | 6/2011 |
| CN | 102239102 | A | 11/2011 |

(Continued)

OTHER PUBLICATIONS

EP Application No. 18198698.5 Extended EP Search Report dated Sep. 19, 2019, 7 pages.

*Primary Examiner* — Marlon T Fletcher
(74) *Attorney, Agent, or Firm* — CANTOR COLBURN LLP

(57) ABSTRACT

According to an aspect, a method includes collecting a calibration set of vibration data for an elevator car at a plurality of landings in a hoistway. One or more characteristic signatures are determined at each of the landings based on the calibration set of vibration data. An analysis set of vibration data is collected for the elevator car. A position of the elevator car is identified in the hoistway based on comparing one or more features of the analysis set of vibration data to the one or more characteristic signatures. An indicator of the position of the elevator car in the hoistway is output.

14 Claims, 4 Drawing Sheets

(56) References Cited

U.S. PATENT DOCUMENTS

| | | | | |
|---|---|---|---|---|
| 7,484,598 | B2 | 2/2009 | Tyni et al. | |
| 8,276,716 | B2 | 10/2012 | Meri et al. | |
| 8,307,953 | B2 | 11/2012 | Ferreira | |
| 8,540,057 | B2 | 9/2013 | Schuster et al. | |
| 8,678,143 | B2 | 3/2014 | Bunter | |
| 9,567,188 | B2 | 2/2017 | Huff et al. | |
| 9,676,591 | B2 * | 6/2017 | Banno | B66B 1/3492 |
| 9,809,419 | B2 | 11/2017 | Otsuka et al. | |
| 9,926,170 | B2 | 3/2018 | Michel et al. | |
| 2017/0029244 | A1 | 2/2017 | Madarasz et al. | |
| 2019/0002238 | A1 * | 1/2019 | Bogli | B66B 5/0087 |
| 2019/0367325 | A1 * | 12/2019 | Pahlke | G01R 19/00 |
| 2019/0382238 | A1 * | 12/2019 | Witczak | B66B 5/0018 |
| 2019/0382239 | A1 * | 12/2019 | Witczak | B66B 1/3407 |
| 2020/0062542 | A1 * | 2/2020 | Sudi | B66B 1/3492 |
| 2020/0109027 | A1 * | 4/2020 | Witczak | B66B 1/40 |
| 2020/0122967 | A1 * | 4/2020 | Sarkar | B66B 5/0025 |

FOREIGN PATENT DOCUMENTS

| | | | | |
|---|---|---|---|---|
| CN | 105540369 | A | 5/2016 | |
| CN | 105704540 | A | 6/2016 | |
| CN | 107810157 | A | 3/2018 | |
| DE | 112013006754 | B4 | 4/2019 | |
| EP | 2489621 | A1 | 8/2012 | |
| EP | 3424862 | A1 * | 1/2019 | B66B 1/3407 |
| EP | 3632830 | A1 * | 4/2020 | B66B 1/3492 |
| EP | 3640188 | A1 * | 4/2020 | B66B 1/28 |
| JP | 05330754 | | 12/1993 | |
| JP | H06263351 | A | 9/1994 | |
| JP | 09208149 | | 8/1997 | |
| JP | 10226470 | | 8/1998 | |
| JP | 2006242826 | | 9/2006 | |
| RU | 2086496 | C1 | 8/1997 | |

* cited by examiner

ELEVATOR CAR POSITION DETERMINATION

CROSS-REFERENCE TO RELATED APPLICATION

This application claims the benefit of the EP Application No. 18198698.5 filed Oct. 4, 2018, which is incorporated herein by reference in its entirety.

BACKGROUND

The embodiments herein relate to elevator systems, and more particularly to an elevator car position determination in a hoistway using sensor data.

Elevator monitoring systems may have limited information available to track the position of an elevator car in a hoistway. While tracking vertical movement of an elevator car from a ground floor reference point may assist in tracking elevator car position, it is possible for reference information to be lost during a power failure or a maintenance override action such that upon recovery, the position of the elevator car within the hoistway (e.g., a floor number) is not readily known. Inaccurate position tracking can hinder predictive maintenance, reduce functionality, and/or result in other effects.

BRIEF SUMMARY

According to an embodiment, a method includes collecting a calibration set of vibration data for an elevator car at a plurality of landings in a hoistway. One or more characteristic signatures are determined at each of the landings based on the calibration set of vibration data. An analysis set of vibration data is collected for the elevator car. A position of the elevator car is identified in the hoistway based on comparing one or more features of the analysis set of vibration data to the one or more characteristic signatures. An indicator of the position of the elevator car in the hoistway is output.

In addition to one or more of the features described herein, or as an alternative, further embodiments include where the calibration set of vibration data and the analysis set of vibration data are collected from one or more vibration sensors configured to detect vibration associated with movement of at least one elevator door.

In addition to one or more of the features described herein, or as an alternative, further embodiments include where the at least one elevator door includes a combination of at least one elevator car door and at least one elevator landing door.

In addition to one or more of the features described herein, or as an alternative, further embodiments include where the one or more characteristic signatures at each of the landings are determined based on one or more of: a time domain analysis, a frequency domain analysis, and a sequence analysis.

In addition to one or more of the features described herein, or as an alternative, further embodiments include where identifying the position of the elevator car includes performing a matching comparison of the one or more features of the analysis set of vibration data to the one or more characteristic signatures at each of the landings based on one or more of: the time domain analysis, the frequency domain analysis, and the sequence analysis.

In addition to one or more of the features described herein, or as an alternative, further embodiments include where the sequence analysis includes a combination of vibration data collected as the elevator car transitions between two of the landings and vibration data collected at one of the landings corresponding to an elevator door movement.

In addition to one or more of the features described herein, or as an alternative, further embodiments include periodically updating the calibration set of vibration data for the elevator car at the landings in the hoistway.

In addition to one or more of the features described herein, or as an alternative, further embodiments include where outputting the indicator of the position of the elevator car in the hoistway includes sending the indicator to one or more of: a service system and an analysis system.

According to an embodiment, a system includes one or more vibration sensors and an elevator car position monitor operably coupled to the one or more vibration sensors. The elevator car position monitor comprising a processing system configured to perform collecting a calibration set of vibration data from the one or more vibration sensors for an elevator car at a plurality of landings in a hoistway and determining one or more characteristic signatures at each of the landings based on the calibration set of vibration data. The processing system is further configured to perform collecting an analysis set of vibration data for the elevator car, identifying a position of the elevator car in the hoistway based on comparing one or more features of the analysis set of vibration data to the one or more characteristic signatures, and outputting an indicator of the position of the elevator car in the hoistway.

In addition to one or more of the features described herein, or as an alternative, further embodiments include where the one or more vibration sensors are configured to detect vibration associated with movement of at least one elevator door comprising a combination of at least one elevator car door and at least one elevator landing door.

Technical effects of embodiments of the present disclosure include determining an elevator car position in a hoistway using vibration data.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
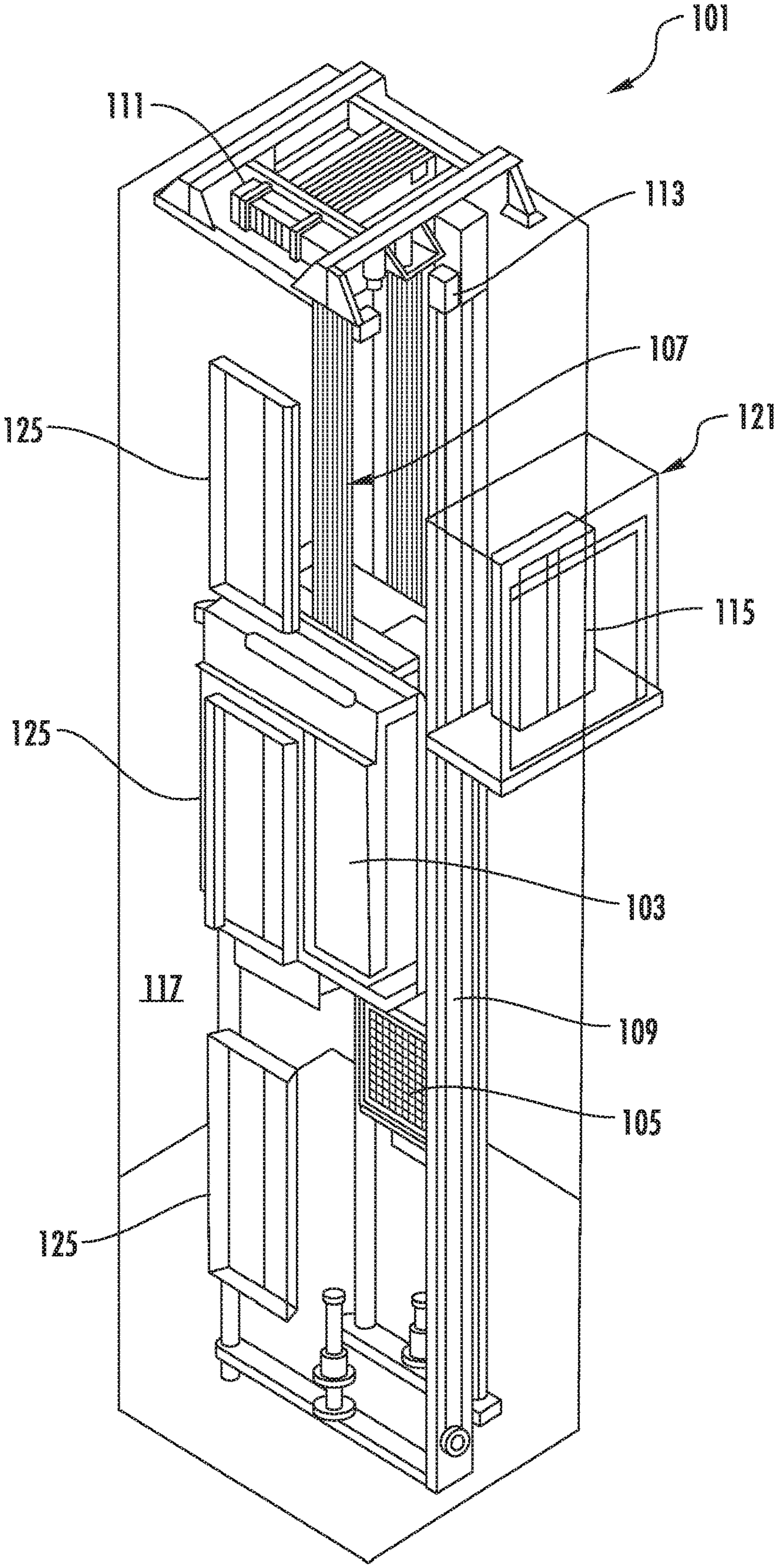
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
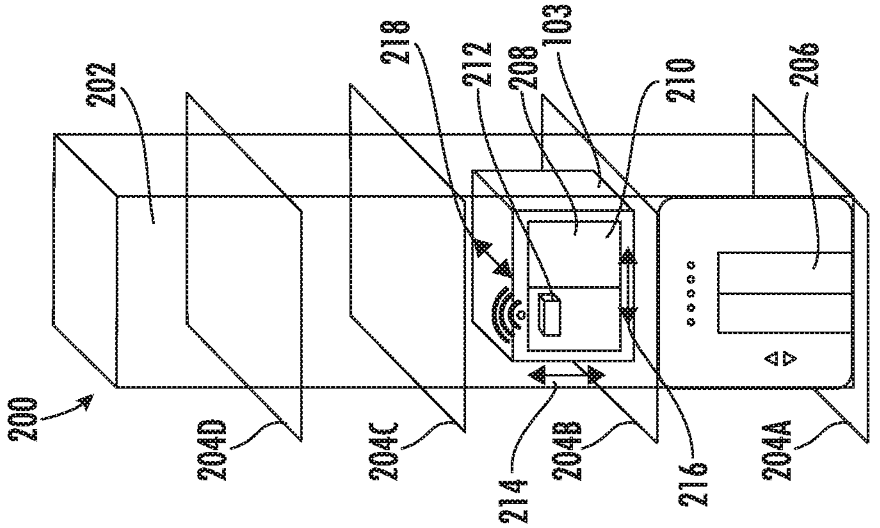
FIG. 2 is a schematic illustration of an elevator system with position monitoring in accordance with an embodiment of the disclosure.

As shown in FIG. 2, an elevator system 200 with position monitoring is illustrated, in accordance with an embodiment of the present disclosure. The elevator system 200 is an example of an embodiment of the elevator system 101 of FIG. 1. As seen in FIG. 2, a hoistway 202 includes a plurality of landings 204A, 204B, 204C, 204D (e.g., landings 125 of FIG. 1), which may be located at separate floors of a structure such as a building. Although the example of FIG. 2 depicts four landings 204A-204D, it will be understood that the hoistway 202 can include any number of landings 204A-204D. Elevator car 103 is operable to travel in the hoistway 202 and stop at landings 204A-204D for loading and unloading of passengers and/or various items. Each of the landings 204A-204D can include at least one elevator landing door 206, and the elevator car 103 can include at least one elevator car door 208. The elevator car doors 208 typically operate in combination with the elevator landing doors 206, where the combination is referred to as one or more elevator doors 210.

Figure 3:
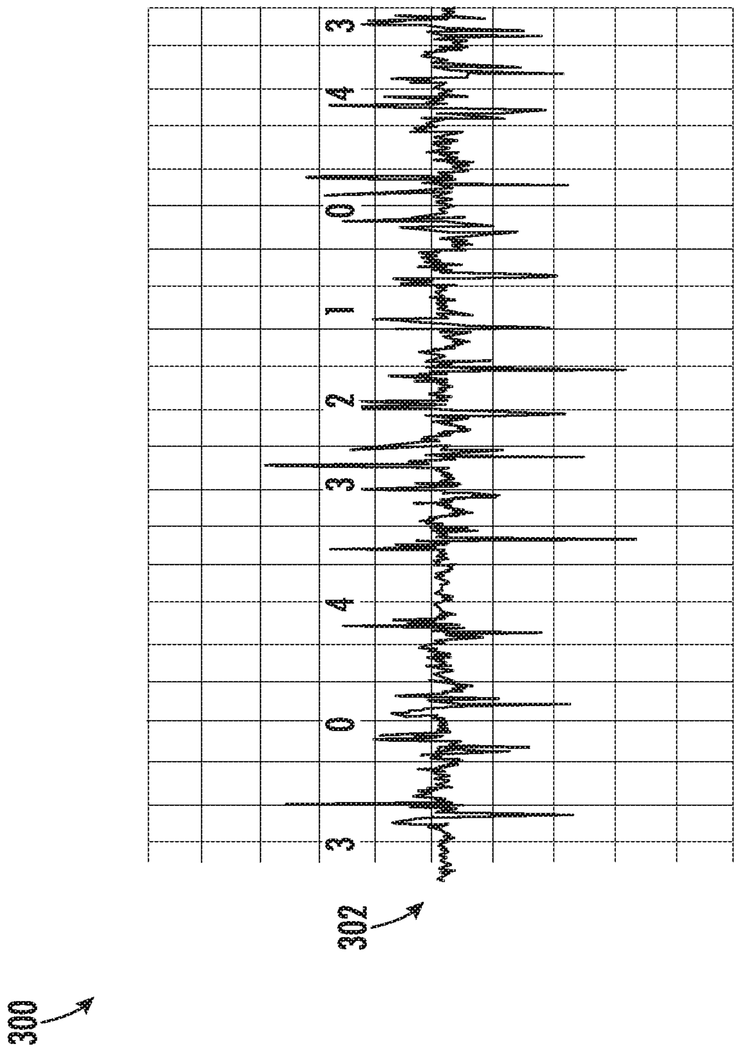
FIG. 3 is a plot of a vibration data that may result from data collection in accordance with an embodiment of the disclosure.

An elevator car position monitor 212 can be operably coupled to the elevator car 103 to determine a position of the elevator car 103 in the hoistway 202, such as determining whether the elevator car 103 is at one of the landings 204A-204D or positioned between two of the landings 204A-204D. The elevator car position monitor 212 is configured to gather vibration data that may be associated with movement of the elevator car 103 through the hoistway 202 and/or movement of a component of the elevator system 200, such as movement of one or more elevator doors 210 (e.g., opening/closing). The vibration data can be collected along one or more axis, for instance, to observe vibration along an axis of motion of the one or more elevator doors 210 and vibration during vertical travel of the elevator car 103 in the hoistway 202 (e.g., up/down vibrations 214, side-to-side vibration 216, front/back vibration 218). An example plot 300 of vibration data is depict in FIG. 3, where vibration signature data 302 can be correlated with positions with the hoistway 202, such as vibration pattern 0 corresponding to a basement position (not depicted), vibration pattern 1 corresponding to landing 204A, vibration pattern 2 corresponding to landing 204B, vibration pattern 3 corresponding to landing 204C, and vibration pattern 4 corresponding to landing 204D. Further position determination details are provided with respect to FIGS. 4 and 5.

Figure 4:
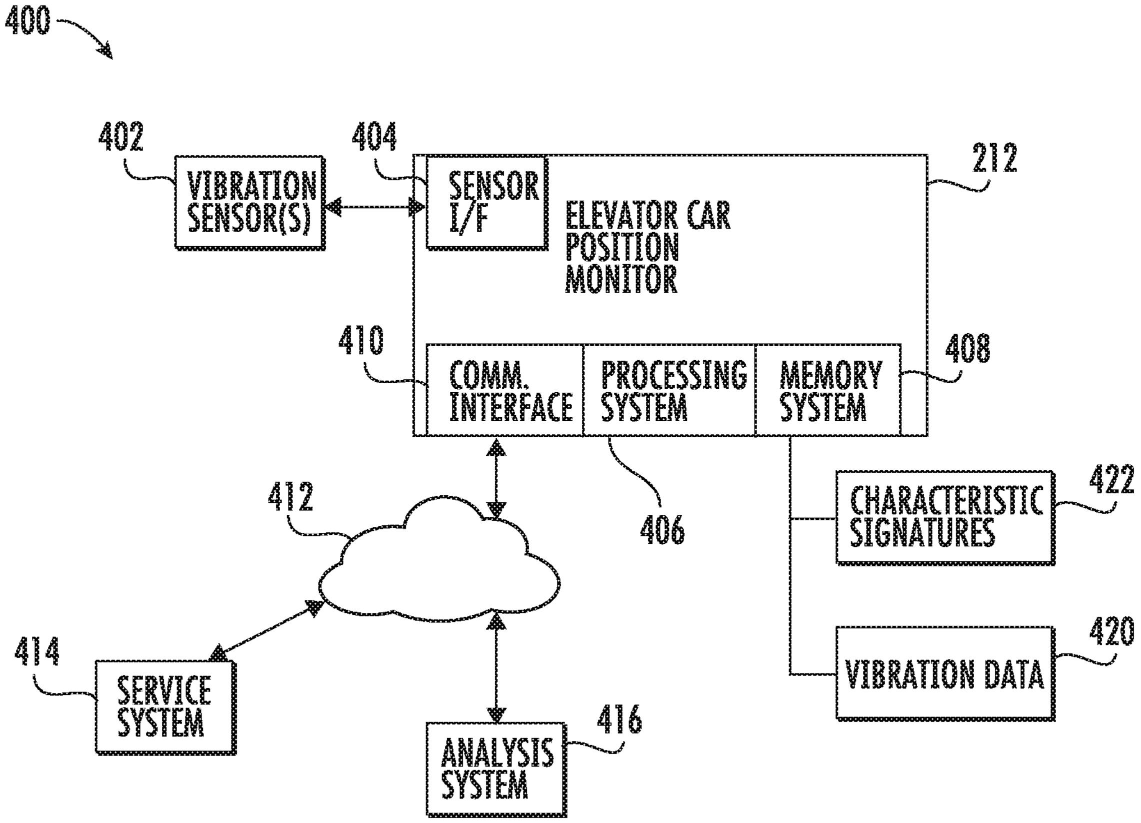
FIG. 4 is a block diagram of an elevator car position monitoring system in accordance with an embodiment of the disclosure.

FIG. 4. depicts an example of an elevator car position monitor system 400 that includes the elevator car position monitor 212 of FIG. 2 operably coupled to one or more vibration sensors 402, for instance, through a sensor interface 404. The sensor interface 404 may provide signal conditioning such as filtering, gain adjustment, analog-to-digital conversion, and the like. The sensor interface 404 may interface with other types of sensors (not depicted), such as pressure sensors, humidity sensors, microphones, and other such sensors. In embodiments, the elevator car position monitor 212 does not have access to global positioning sensors information and uses the one or more vibration sensors 402 to determine a position of the elevator car 103 within the hoistway 202 of FIG. 2 based at least in part on vibration data 420.

The elevator car position monitor 212 can also include a processing system 406, a memory system 408, and a communication interface 410 among other interfaces (not depicted). The processing system 406 can include any number or type of processor(s) operable to execute instructions. For example, the processing system 406 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 408 may be a storage device such as, for example, a random access memory (RAM), read only memory (ROM), or other electronic, optical, magnetic or any other computer readable storage medium. The memory system 408 is an example of a tangible storage medium readable by the processing system 406, where software is stored as executable instructions for execution by the processing system 406 to cause the system 400 to operate as described herein. The memory system 408 can also store various types of data such as vibration data 420 acquired from the one or more vibration sensors 402 and characteristic signatures 422 to support classification of the vibration data 420 relative to positions within the hoistway 202 of FIG. 2 as further described in FIG. 5, which can be performed locally, cloud-based, or otherwise distributed between one or more components.

The communication interface 410 can establish and maintain connectivity over a network 412 using wired and/or wireless links (e.g., Internet, cellular, Wi-Fi, Bluetooth, Z-Wave, ZigBee, etc.) with one or more other systems, such as a service system 414, an analysis system 416, and/or to access various files and/or databases (e.g., software updates). The service system 414 can be a device used by a mechanic or technician to support servicing of the elevator system 200 of FIG. 2. The analysis system 416 can be part of a predictive maintenance system that correlates various sources of data associated with operation of the elevator system 200, such as position information of the elevator car 103 of FIG. 2, to track system health, predict issues, and schedule preventive maintenance actions, which can be performed locally, cloud-based, or otherwise distributed between one or more components.

Figure 5:
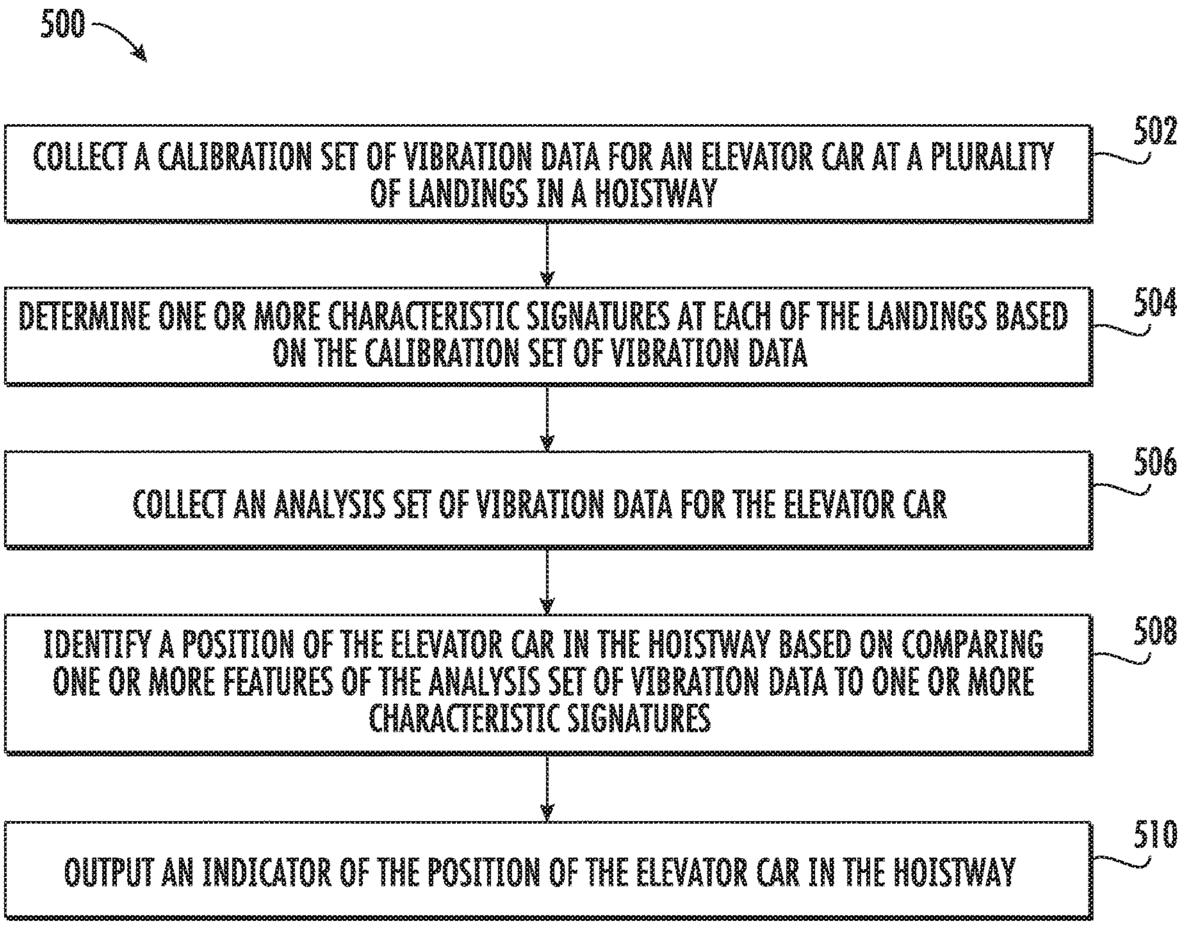
FIG. 5 is a flow chart of a method in accordance with an embodiment of the disclosure.

Referring now to FIG. 5, while referencing FIGS. 1-4, FIG. 5 shows a flow chart of a method 500 in accordance with an embodiment of the disclosure. At block 502, the elevator car position monitor 212 collects a calibration set of vibration data 420 for an elevator car 103 at a plurality of landings 204A-204D in a hoistway. The calibration set of vibration data 420 can be collected during a system commissioning process as the elevator car 103 travels to and stops at each of the landings 204A-204D while monitoring the one or more vibration sensors 402. The collection of the calibration set of vibration data 420 can include detection of vibrations associated with movement of at least one elevator door 210. For instance, the at least one elevator door 210 can be opened and closed at each of the landings 204A-204D during system commissioning to establish the calibration set of vibration data 420. Since the vibration characteristics of the elevator system 200 may change over time, the elevator car position monitor 212 can support periodically updating the calibration set of vibration data 420 for the elevator car 103 at the landings 204A-204D in the hoistway 202, for instance, responsive to a command from the service system 414. Periodic updates can be performed according to a servicing schedule and may occur at any supported interval of time, such as daily, weekly, monthly, quarterly, annually, and the like.

At block 504, the elevator car position monitor 212 determines one or more characteristic signatures 422 at each of the landings 204A-204D based on the calibration set of vibration data 420. The characteristic signatures 422 may be defined and determined using one or more analysis techniques, such as one or more of a time domain analysis, a frequency domain analysis, and a sequence analysis. The time domain analysis can include monitoring for waveform shapes, peaks, phase relationships, slopes, and other such features. Time domain analysis may be performed based on data acquired from the one or more vibration sensors 402 and can include time-based correlations with other data sources, such as audio data, pressure data, and the like. Frequency domain analysis can include performing a domain transform, such as a Fast Fourier Transform, a Wavelet Transform, and other such known transforms, based on time domain data collected from the one or more vibration sensors 402. Frequency domain analysis can be used to examine frequency, magnitude, and phase relationships. Time domain analysis can be used to localize data sets in time, for instance, where a rise in root-mean-square (RMS) occurs during a segment of time, the corresponding segment can be provided for frequency domain analysis. Sequence analysis can include identifying a combination of events or signatures to create a more complex signature. For instance, sequence analysis may include identifying a combination of vibration data 420 collected as the elevator car 103 transitions between two of the landings 204A-204D and vibration data 420 collected at one of the landings 204A-204D corresponding to an elevator door 210 movement. Squeaks, rattles, bumps, imbalances, and other such variations may be localized and repeatable at various positions in the elevator system 200, which can be captured as the characteristic signatures 422.

At block 506, the elevator car position monitor 212 collects an analysis set of vibration data 420 for the elevator car 103. The analysis data set of vibration data 420 can be collected during operation of the elevator car 103. Similar analysis method can be applied to the analysis set of vibration data 420 as used to create the characteristic signatures 422 to perform a matching comparison of one or more features of the analysis set of vibration data 420 to the one or more characteristic signatures 422 at each of the landings 204A-204D based on one or more of: a time domain analysis, a frequency domain analysis, and a sequence analysis. For instance, while the elevator car 103 is halted in the hoistway 202, the elevator car position monitor 212 can collect vibration data 420 from the one or more vibration sensors 402 while the elevator doors 210 are cycled opened and shut as the analysis set of vibration data 420. The analysis set of vibration data 420 can also include data collection while the elevator car travels through the hoistway 202 between the landings 204A-204D.

At block 508, the elevator car position monitor 212 identifies a position of the elevator car 103 in the hoistway 202 based on comparing one or more features of the analysis set of vibration data 420 to the one or more characteristic signatures 422. Features extracted from the analysis set of vibration data 420 can be compared to the characteristic signatures 422 to determine whether the analysis set of vibration data 420 most closely matches vibration pattern 0, 1, 2, 3, or 4 associated with landings 204A-204D, for instance. Tracking of features between the landings 204A-204D, such as vibration signatures associated with a rail misalignment between two of the landings 204A-204D can further assist in identifying the position of the elevator car 103. Further, vertical motion of the elevator car 103 upward or downward may be detected using the one or more vibration sensors 402 to determine a direction of travel of the elevator car 103 and further assist in identifying the position of the elevator car 103.

At block 510, the elevator car position monitor 212 outputs an indicator of the position of the elevator car 103 in the hoistway 202. For example, the elevator car position monitor 212 may send the indicator to one or more of: a service system 414 and an analysis system 416 through network 412 or an alternate communication channel.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:

collecting a calibration set of vibration data for an elevator car at a plurality of landings in a hoistway;

determining one or more characteristic signatures at each of the landings based on the calibration set of vibration data;

collecting an analysis set of vibration data for the elevator car, wherein the calibration set of vibration data and the analysis set of vibration data are collected from one or more vibration sensors configured to detect vibration associated with movement of at least one elevator door comprising opening and closing of the at least one elevator door;

identifying a position of the elevator car in the hoistway based on comparing one or more features of the analysis set of vibration data to the one or more characteristic signatures; and outputting an indicator of the position of the elevator car in the hoistway.

2. The method of claim 1, wherein the at least one elevator door comprises a combination of at least one elevator car door and at least one elevator landing door.

3. The method of claim 1, wherein the one or more characteristic signatures at each of the landings are determined based on one or more of: a time domain analysis, a frequency domain analysis, and a sequence analysis.

4. The method of claim 3, wherein identifying the position of the elevator car comprises performing a matching comparison of the one or more features of the analysis set of vibration data to the one or more characteristic signatures at each of the landings based on one or more of: the time domain analysis, the frequency domain analysis, and the sequence analysis.

5. The method of claim 4, wherein the sequence analysis comprises a combination of vibration data collected as the elevator car transitions between two of the landings and vibration data collected at one of the landings corresponding to an elevator door movement.

6. The method of claim 1, further comprising:

periodically updating the calibration set of vibration data for the elevator car at the landings in the hoistway.

7. The method of claim 1, wherein outputting the indicator of the position of the elevator car in the hoistway comprises sending the indicator to one or more of: a service system and an analysis system.

8. A system comprising:

one or more vibration sensors configured to detect vibration associated with movement of at least one elevator door comprising opening and closing of the at least one elevator door; and an elevator car position monitor operably coupled to the one or more vibration sensors, the elevator car position monitor comprising a processing system configured to perform:

collecting a calibration set of vibration data from the one or more vibration sensors for an elevator car at a plurality of landings in a hoistway;

determining one or more characteristic signatures at each of the landings based on the calibration set of vibration data;

collecting an analysis set of vibration data for the elevator car from the one or more vibration sensors;

identifying a position of the elevator car in the hoistway based on comparing one or more features of the analysis set of vibration data to the one or more characteristic signatures; and outputting an indicator of the position of the elevator car in the hoistway.

9. The system of claim 8, wherein the one or more vibration sensors are configured to detect vibration associated with movement of the at least one elevator door comprising a combination of at least one elevator car door and at least one elevator landing door.

10. The system of claim 8, wherein the one or more characteristic signatures at each of the landings are determined based on one or more of: a time domain analysis, a frequency domain analysis, and a sequence analysis.

11. The system of claim 10, wherein identifying the position of the elevator car comprises performing a matching comparison of the one or more features of the analysis set of vibration data to the one or more characteristic signatures at each of the landings based on one or more of: the time domain analysis, the frequency domain analysis, and the sequence analysis.

12. The system of claim 11, wherein the sequence analysis comprises a combination of vibration data collected as the elevator car transitions between two of the landings and vibration data collected at one of the landings corresponding to an elevator door movement.

13. The system of claim 8, wherein the processing system is configured to perform:

periodically updating the calibration set of vibration data for the elevator car at the landings in the hoistway.

14. The system of claim 8, wherein outputting the indicator of the position of the elevator car in the hoistway comprises sending the indicator to one or more of: a service system and an analysis system.

* * * * *